United States Patent
Pham

(10) Patent No.: US 9,563,327 B1
(45) Date of Patent: Feb. 7, 2017

(54) INTELLIGENT ADJUSTMENT OF GRAPHICAL USER INTERFACES

(71) Applicant: Tapjoy, Inc., San Francisco, CA (US)

(72) Inventor: Hai-Van Pham, Milpitas, CA (US)

(73) Assignee: Tapjoy, Inc., San Francisco, CA (US)

( * ) Notice: Subject to any disclaimer, the term of this patent is extended or adjusted under 35 U.S.C. 154(b) by 263 days.

(21) Appl. No.: 13/828,771

(22) Filed: Mar. 14, 2013

(51) Int. Cl.
    *G06F 3/048* (2013.01)
    *G06F 3/0481* (2013.01)

(52) U.S. Cl.
    CPC .................................. *G06F 3/0481* (2013.01)

(58) Field of Classification Search
    None
    See application file for complete search history.

(56) References Cited

U.S. PATENT DOCUMENTS

| 8,458,615 B2* | 6/2013 | Chaudhri | 715/803 |
| 2006/0048069 A1* | 3/2006 | Igeta | 715/769 |
| 2011/0179383 A1* | 7/2011 | Morris | 715/790 |
| 2011/0252364 A1* | 10/2011 | Anzures | G06F 3/04883 715/790 |
| 2011/0281619 A1* | 11/2011 | Cho et al. | 455/566 |

* cited by examiner

*Primary Examiner* — Anil N Kumar
(74) *Attorney, Agent, or Firm* — Hickman Palermo Becker Bingham LLP

(57) ABSTRACT

A graphical user interface displayed at a mobile computing device may adjust dynamically and automatically in response to detecting a pattern of user interactions with the graphical user interface. Adjustments to the graphical user interface may include causing content to advance automatically, removing or resizing the display of particular interface components, re-locating components of the interface, and causing display events to occur automatically. The device may cause such adjustments to occur in response to detecting patterns of user interactions with the graphical user interface. The detection of user interaction pattern may include determining when content advancement commands are received, when viewing of the interface is terminated, whether particular components of the interface are not selected, the locations of the interface with which the user interacts, or which user commands for display events are frequently received.

10 Claims, 9 Drawing Sheets

INTELLIGENT ADJUSTMENT OF GRAPHICAL USER INTERFACES

TECHNICAL FIELD

Embodiments relate to the automatic adjustment of graphical user interfaces, particularly graphical user interfaces displayed at mobile devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Due to the prevalence of mobile devices, mobile applications are now commonly used for a wide variety of user purposes, including daily activities such as shopping online, consuming news or other content, viewing driving directions, or searching for restaurants. Because of the portability of mobile devices, mobile applications are often used on-the-go and in a hurried manner. For these reasons, application developers have an incentive to make applications as user-friendly and efficient to use as possible in an on-the-go environment. In some applications, user interfaces are context-sensitive so that the number and arrangement of user interface widgets changes according to the context of a particular app function or feature. However, context-sensitive user interfaces typically use a relatively static and narrow set of possible changes. In particular, standard context-sensitive user interfaces normally cannot adapt on a per-user basis to the particular operational preferences or habits of a user of the interface.

DESCRIPTION OF EXAMPLE EMBODIMENTS

Figure 1:
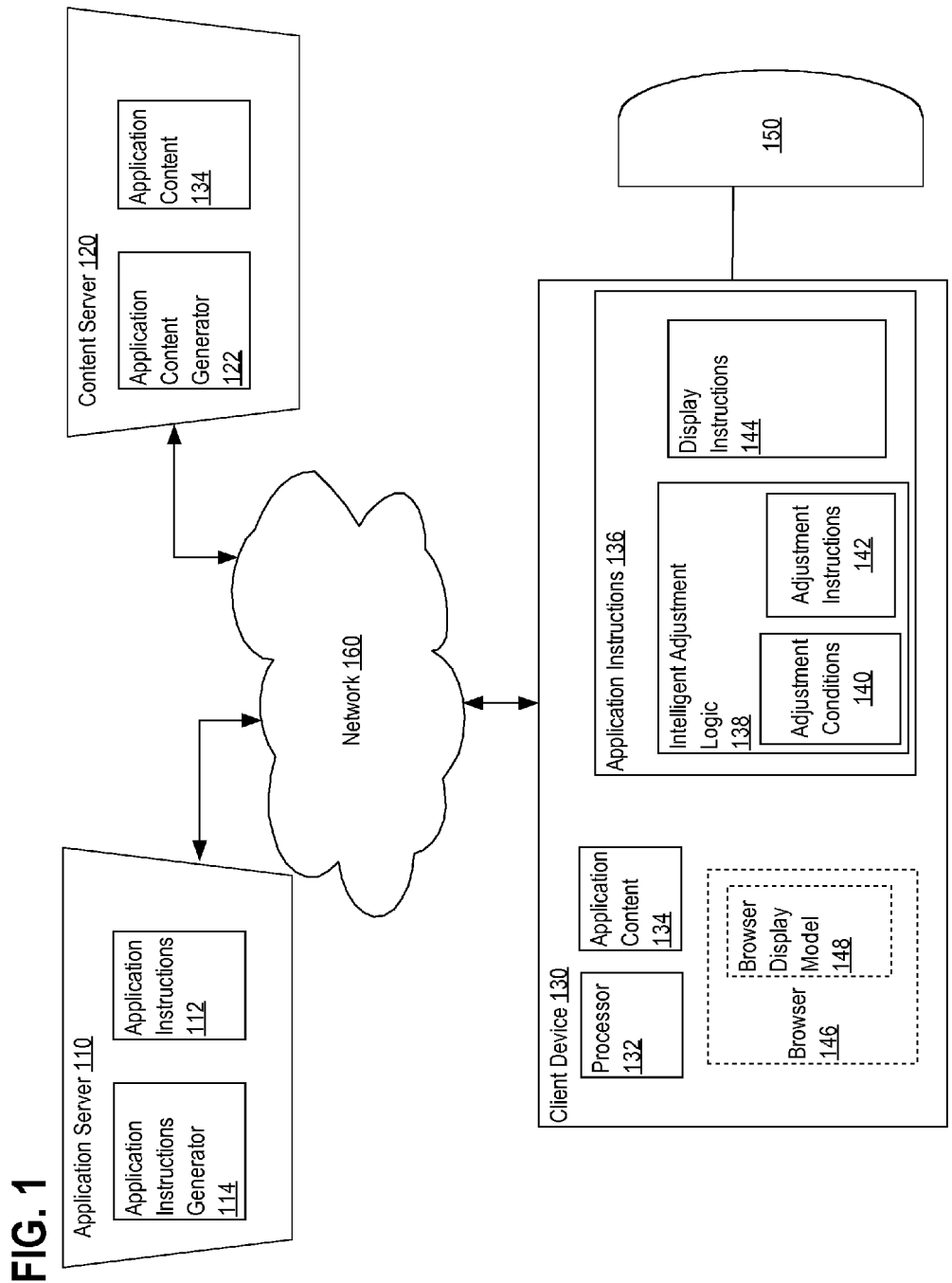
FIG. 1 illustrates an example computer system that may be used to implement an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
 2.1 Intelligent Content Advancement
 2.2 Intelligent Modification of Content Display Location
 2.3 Intelligent Removal or Resizing of Interface Components
 2.4 Intelligent Re-Location of Graphical User Interface Components
 2.5 Intelligent Automation of a Display Event
 2.6 Intelligent Interface Adjustment Based On Browser Information
3.0 Implementation Mechanisms—Hardware Overview
4.0 Extensions and Alternatives
1.0 General Overview Techniques for the intelligent adjustment of graphical user interfaces are described. In one embodiment, if enabled based upon explicit user input or configuration data for an application program, the processes described herein can make certain changes to operation of the graphical user interface of an application program occur, based upon detecting patterns in user interaction with the application, or other factors. Alternatively, an embodiment can be integrated into the application program so that patterns of user interaction with the application are always considered and used to determine whether to make changes in operation of the graphical user interface.

According to an embodiment, one or more content advancement commands are received. Based, at least in part, on the one or more received content advancement commands, the embodiment determines an occurrence of a pattern of receiving a particular content advancement command of the one or more content advancement commands, upon occurrence of a particular event. Based, at least in part, on the occurrence of the pattern that was determined, the embodiment automatically determines content advancement instructions that indicate that particular content is to advance automatically in response to a future occurrence of the same content advancement triggering event.

According to another embodiment, the embodiment causes display of a first content at a client device according to original display instructions that indicate, at least in part, that a first portion of the first content is to display at an original location. The embodiment automatically determines that viewing of the first content is terminated after a second portion of the first content is viewed and before the first portion of the first content is viewed. Based on the determination, the embodiment automatically determines modified display instructions that indicate, at least in part, that content corresponding to the first portion of the first content is to be displayed in a particular location that is different from the original location.

In another embodiment, the embodiment receives user interaction information indicating one or more interactions with a first graphical user interface. The embodiment determines, based on the received user interaction information, that a pattern of selection of a first component of the first graphical user interface displayed at a particular location of the first graphical user interface has occurred. In response to determining that the pattern of selection has occurred, the embodiment causes a second component associated with the first component to not display at the particular location or to display according to a different size.

In an embodiment, the embodiment receives user interaction information, wherein the user interaction information indicates one or more locations of a graphical user interface of a display unit of a computing device with which a user interacted. The embodiment automatically determines, based on the user interaction information, that a pattern of user interaction has occurred, wherein the determination that the pattern has occurred indicates that a first region of the graphical user interface received a plurality of user interactions and that the first region received more user interaction than a second region of the graphical user interface, wherein the first region and the second region do not overlap. In response to determining that the pattern has occurred, the embodiment causes the computing device to modify the graphical user interface by displaying, in the first region, one or more graphical user interface elements that had been displayed in the second region before the modifying.

In another embodiment, the embodiment determines that a pattern of receiving a user command for causing a first display event of a graphical user interface of a computing device has occurred. In response to determining that the pattern has occurred, the embodiment stores display information for automatically causing an occurrence of a second display event. The embodiment automatically causes, based on the stored display information, the second display event in the graphical user interface of the computing device.

According to another embodiment, the embodiment receives, from a web browser, browser information comprising browser window size information or client device system information. The embodiment automatically causes, based at least in part on the browser information, particular colors of at least a portion of the graphical user interface of a particular application to change to brighter colors without causing a modification to any interfaces outside the particular application.

As a result, a user interface for a computer program, including but not limited to graphical user interfaces of apps of mobile computing devices, can automatically adapt to the particular usage patterns or habits of a particular user of a computing device. The pattern recognition techniques of the disclosure may be used to automatically reconfigure a variety of aspects of a user interface, including implementing automatic scrolling, adding or omitting various user interface elements, altering typography, and other changes. Consequently, the efficiency and processing speed of the computing device may be improved because the computing device does not need to display user interface widgets, wait for particular user input, or operate in a particular way that is never used or requested by the user or that does not conform to a particular user's operational preferences, habits or patterns.

2.0 Structural and Functional Overview

In an embodiment, a graphical user interface of a particular application displayed at a computing device adjusts dynamically and automatically in response to a detected pattern of user interactions with the graphical user interface. Instructions for causing the adjustment in the graphical user interface of a particular application may be included in the instructions of the particular application. The user interactions may be interactions with a touch screen of the mobile computing device, such as touching locations of the screen where components of the graphical user interface are displayed or performing gestures on the touch screen. Causing adjustments to the graphical user interface may include causing content or components of the graphical user interface to be removed or displayed at different locations or in different sizes, or causing certain display events, such as scrolling or zooming, to occur automatically in response to a triggering event, without necessarily receiving a user command for causing the display events.

The detection of user interaction patterns may include determining when content advancement commands are received, when viewing of the interface is terminated, whether particular components of the interface are not selected, the locations of the interface with which the user interacts, or which user commands for display events occur frequently.

FIG. 1 illustrates an example computer system that may be used to implement an embodiment. The computer system comprises an application server 110 and one or more client computers, such as client device 130. Application server 110 may comprise application instructions 112 that are downloadable by one or more client devices. Application server 110 may comprise application instructions generator 114, which generates at least portions of application instructions 136 including updates to application instructions 136 that are sent to client device 130 after client device 130 downloads a first version of the application.

Client device 130 may be any computing device logically arranged as a client of the application server 110, such as a mobile phone, tablet computer, laptop computer, or desktop computer, and may be operated by a particular user. Client device 130 may comprise a touch screen with which users may interact. Application instructions 136 may be downloaded from application server 110 to the client device 130 and installed and executed on the client device.

Application instructions 136 may be executed by one or more processors of client device 130, such as processor 132. Application instructions 136 may comprise instructions for any of a variety of client applications, such as an application for browsing news, online shopping, or viewing reward offers to be granted in exchange for particular user actions.

Application instructions 136 may comprise instructions related to the display of a graphical user interface, such as display instructions 144, which may be configured to cause the graphical user interface to display at display unit coupled to the display instructions, such as display unit 150. Display instructions 144 may control the display of one or more components of the graphical user interface. For example, display instructions 144 may control whether one or more graphical user interface component(s) are displayed, when the graphical user interface component(s) are displayed, the size of displayed graphical user interface component(s), or the locations at which the graphical user interface component(s) are displayed. Display instructions 144 may control the occurrence of one or more display events, such as zooming in or out, increasing font size, modifying font style, rotating the display, or advancing of content. Application instructions 136 may comprise particular application content, such as application content 134, which may be updated periodically.

Application instructions 136 may comprise intelligent adjustment logic 138, which may include instructions that are configured for causing the graphical user interface(s) of the application to adjust dynamically and automatically in response to a detected pattern of user interactions with the graphical user interface as described herein. Intelligent adjustment logic 138 may comprise a set of conditions, such as adjustment conditions 140. The occurrence of a condition of adjustment conditions 140 may trigger client device 130 to adjust the graphical user interface. Client device 130 may adjust the graphical user interface by modifying display instructions 144 and may, for example, change how a particular graphical interface component is displayed or when a particular display event is to occur. Adjustment instructions 142 may contain instructions for causing the adjustment of the graphical user interface, and client device 130 may execute at least a portion of adjustment instructions 142 in response to determining that a condition of adjustment conditions 140 has occurred. Adjustment instructions 142 may cause the adjustment in response to determining that a condition of adjustment conditions 140 has occurred and by modifying display instructions 144, which may control the display of one or more components of the graphical user interface.

In some embodiments, client device 130 downloads and processes application instructions 136 in response to a request for a web page, such as an HTTP request. Application instructions 136 may require a web browser, such as browser 146, to retrieve and/or interpret the instructions of application instructions 136. Browser 146 may process application instructions 136 and may cause the display of the graphical user interface of application instructions 136 at display unit 150. The instructions of adjustment logic 138 may be programmed, at least partially, in a client-side scripting language such as JavaScript. In other embodiments, application instructions 136 comprise a native, locally installed application or app and a browser is not required to process the instructions of application instructions 136.

In some embodiments, at least a portion of intelligent adjustment logic 138 resides on application server 110. Application instructions 136 may collect information, such as user interaction information or browser information, and send the information to application server 110. In response, application instructions generator 114 may determine and send, to client device 130, adjustment instructions and/or modified display instructions for causing a particular interface adjustment.

In some embodiments, client device 130 detects the occurrence of a condition requiring an adjustment to the graphical user interface and causes the adjustment to the graphical user interface without communicating with server computers or other network entities external to client device 130. In such an embodiment, the processing of intelligent adjustment logic 138 instructions may cause the detection and adjustment.

By processing the instructions of intelligent adjustment logic, client device 130 may determine if any conditions of adjustment conditions 140 have occurred and if so, may cause client device 130 to determine which adjustment instruction of adjustment instructions 142 corresponds to the condition, and may further cause client device 130 to execute the adjustment instruction. Client device 130 may detect the adjustment condition and may cause the adjustment dynamically and without requiring any communication with an external server.

Client device 130 may be communicatively coupled to an application server, such as application server 110, and a content server, such as content server 120, via network, such as network 160. Application content 134 may be obtained from content server 120 and application instructions 136 may be obtained from application server application server 110. In some embodiments, application server 110 and content server 120 are the same server process or comprise the same server computer. Client device 130 may modify portions of application instructions 136, such as display instructions 144, after application instructions 136 are downloaded to client device 130. For example, client device 130 may modify display instructions 144 in response to detecting that a particular user interaction pattern, which may be specified in adjustment conditions 140, has occurred. The modification may cause an adjustment to the graphical user interface displayed at display unit 150.

2.1 Intelligent Content Advancement

In some embodiments, client device 130 causes content to advance automatically in response to determining that a pattern of receiving content advancement commands has occurred. The automatic advancement of content may allow the user to browse content in a hands-free manner.

Figure 2:
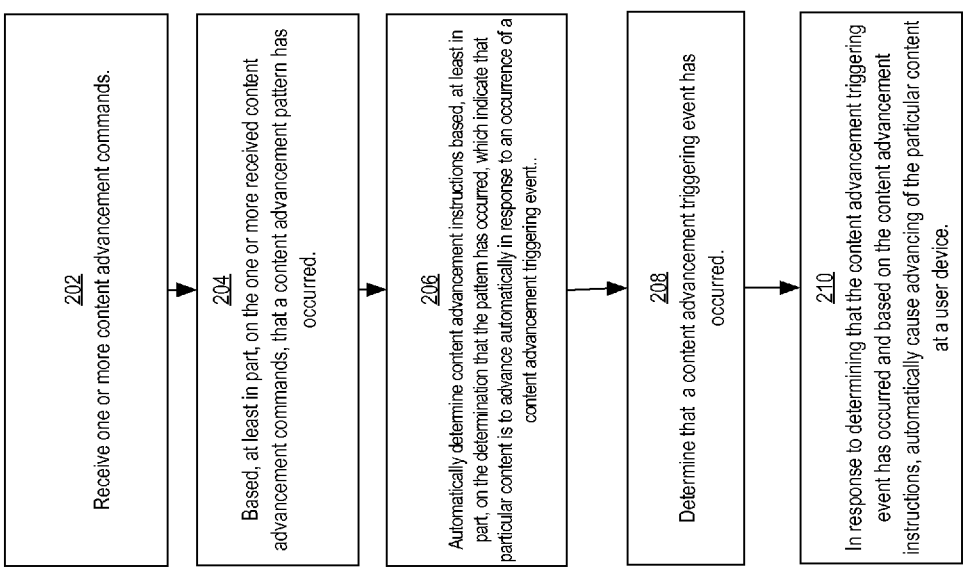
FIG. 2 illustrates an example method for the intelligent advancement of content.

FIG. 2 illustrates an example method for the intelligent advancement of content. The example method may be implemented at client device 130. At block 202, client device 130 receives one or more content advancement commands. A content advancement command may be a command to scroll content of a graphical user interface. In this context, scrolling of content refers to causing movement of displayed content such that a portion of the content, which was previously within the visible frame of the graphical user interface, shifts outside the visible frame, and a new portion of the content, which was previously outside the visible frame of the interface, shifts within the visible frame. The remainder of the content shifts its location of display within the visible frame of the graphical user interface.

The content advancement command may also be a pagination command, which causes displaying an entirely new portion of the content, such as a new page, in a location where no portion of the content that was displayed prior to the pagination command is displayed. For example, the content advancement command may cause the next page of an article or the next page of items to be displayed.

The content may be caused to advance in any direction, such as horizontally or vertically. The content to be advanced may include text and/or graphics. In an embodiment, the content to be advanced is a list of actions that may be completed in exchange for an offered reward.

At block 204, based at least in part on the one or more received content advancement commands, client device 130 may determine that a content advancement pattern has occurred. A content advancement pattern is a pattern of receiving one or more content advancement commands upon occurrence of a particular pattern event. In some embodiments, the particular pattern event is the elapsing of a particular amount of time after the occurrence of a second particular event. For example, a particular pattern may require receiving a pagination command about four to seven seconds after a particular portion of the graphical user interface is selected, and that the occurrence is repeated at least three times. Client device 130 may determine that a pattern has occurred based on a determination that a command to paginate was received from a user five seconds after the user selected the particular portion of the graphical user interface, and that the occurrence was repeated three times.

An example pattern event is the elapsing of seven seconds after a scroll command that causes the last portion of the content to appear within the visible frame of the graphical user interface. Another example pattern event is the elapsing of a specified amount of time after an earlier performance of a content advancement command that is subsequently repeated. For example, a particular pattern may require that the user perform a particular content advancement command twenty seconds after an earlier performance of the same content advancement command or any content advancement command, and that the occurrence be repeated at least twice. Yet another example pattern event is the elapsing of a specified amount of time after particular content is displayed.

In embodiments where the particular pattern event is the elapsing of a particular amount of time after the occurrence of a second particular event, the second particular event may be any of a number of events relating to the graphical user interface, depending on the embodiment. Examples of such second particular events include, but are not limited to, the loading of a page, the occurrence of a prior content advancement command, or the selection of particular location(s) of a graphical user interface.

In some embodiments, the particular pattern event is the elapsing of a length of time since the occurrence of a second particular event, where the length of time elapsed may be any length of time within a specified range. For example, the pattern, whose occurrence is detected, may require that the user perform a content advancement command ten to fifteen seconds after the content of the graphical user interface loads. In such an embodiment, a first content advancement command may be received from a user ten seconds after the content loads and a second content advancement command may be received from the user fourteen seconds after the content loads, and based on the first and second content advancement commands, client device 130 may determine that a pattern of the user performing a content advancement command ten to fifteen seconds after the content loads.

For some content advancement patterns, the content advancement pattern occurs only if the corresponding content advancement command is received upon the occurrence of a corresponding pattern event on at least two different occasions. Other patterns may require the sequence to be repeated less or more times.

At block 206, client device 130 automatically determines content advancement instructions based, at least in part, on the determination that the pattern has occurred, which indicate that particular content is to advance automatically in response to an occurrence of a content advancement triggering event. Such content advancement instructions may replace or update a previous version of display instructions, such as display instructions 144, which may control when and how content is advanced.

In an embodiment, intelligent adjustment logic 138 comprises adjustment conditions 140 that describe content advancement patterns for which occurrences are to be detected. The content advancement patterns may be patterns for which adjustment instructions are defined. For example, adjustment conditions 140 may include a condition corresponding to receiving a content advancement commands ten to fifteen seconds after another content advancement command, and may require repeating this sequence three times. In such an embodiment, if such a condition occurs, a content advancement pattern is determined to occur, and a particular adjustment instruction of adjustment instructions 142 may be defined for such a pattern. The particular adjustment instructions may include instructions for updating display instructions 144, where the updated display instructions cause the content to advance automatically in response to an occurrence of the content advancement triggering event.

The particular content advancement triggering event may vary according to different embodiments and depending on which pattern is determined. In some embodiments, the advancement triggering event is the same as the particular pattern event of the content advancement pattern. For example, in response to determining a pattern of receiving a pagination command five seconds after scrolling to the bottom of a page, a particular content advancement instruction may be automatically determined, which indicates that the page is to paginate automatically in response determining that five seconds have elapsed since scrolling to the bottom of the page.

In other embodiments, the particular content advancement triggering event may be determined based on the particular pattern event but may be different than the particular pattern event. For example, a first scrolling command may be received twelve seconds after a prior scrolling command and a second scrolling command may be received fourteen seconds after a prior scrolling command. Based on the first and second scrolling commands, a pattern of receiving scrolling commands upon the elapsing of ten to fifteen seconds since a prior scrolling command may be determined to occur. Based on the determined pattern occurrence, client device 130 may determine content advancement instructions that correspond to the pattern. The content advancement instructions may indicate that scrolling is to occur automatically in response to determining that fifteen seconds have elapsed since a prior scrolling event occurred. Therefore, in such an embodiment, the content advancement triggering event, which is the elapsing of sixteen seconds after an occurrence of a prior scrolling event, is different than any command that was previously received.

In some embodiments, the content advancement triggering event is the elapsing of a particular amount of time after an occurrence of a prior scrolling event, where the particular amount of time is determined based on the received content advancement commands. For example, the particular amount of time may be the average of the amount of time that elapses between the occurrence of a prior scrolling event and the receipt of the next scrolling command.

At block 208, client device 130 determines that a content advancement triggering event has occurred. At block 210, in response to determining that the content advancement triggering event has occurred and based on the content advancement instructions, client device 130 causes advancing of the particular content specified by the content advancement instructions at the client device. For example, according to particular content advancement instructions, the triggering event may be the elapsing of fifteen seconds after an occurrence of a prior scrolling event. Client device 130 may determine that fifteen seconds have elapsed since contents of the graphical user interface were last scrolled, and as a result, may automatically cause the scrolling.

In some embodiments, client device 130 determines that patterns relating to the properties of the content advancement commands have occurred, and causes the content to advance according to those properties or related properties. The determined content advancement instructions may contain instructions, which when processed, cause the content to advance according to such properties.

For example, client device 130 may determine a content advancement pattern where the scroll command is received five seconds after the graphical user interface content loads. Client device 130 may also determine a pattern relating to a property of the content advancement command, such as a pattern that the received scroll commands each indicate that approximately 300 pixels of the content is to be scrolled. In some embodiments, the content advancement instructions, which are determined based on the determined content advancement pattern, instruct that the content advancement is to occur according to the properties of the pattern. Thus, the content advancement instructions may indicate that the content is to scroll five seconds after the content of the graphical user interface loads and the scrolling is to span 300 pixels of the content.

The content advancement properties may be any property relating to the content advancement command, such as the amount of content to be advanced, the speed of the advancement, or the direction of the advancement.

2.2 Intelligent Modification of Content Display Location

Figure 3:
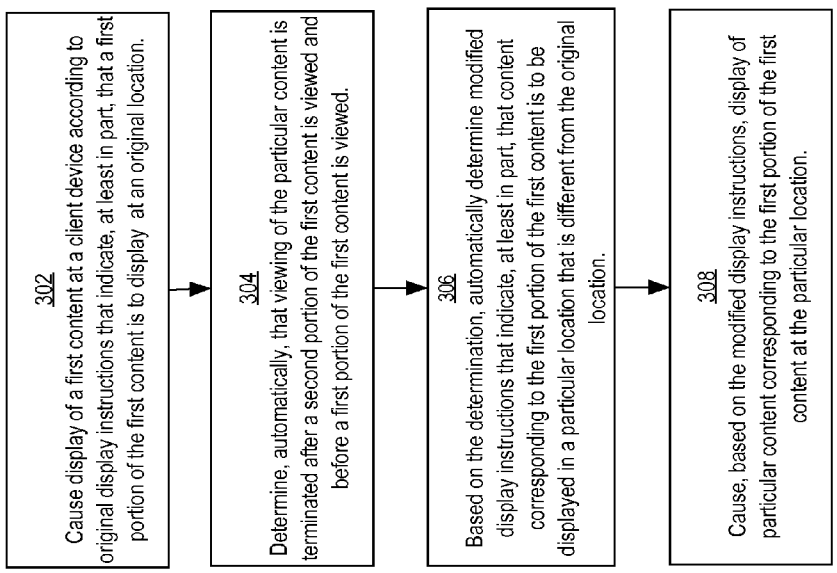
FIG. 3 illustrates an example method for the intelligent modification of content display locations.

FIG. 3 illustrates an example method for the intelligent modification of content display locations. The example method may be implemented at client device 130 of FIG. 1 using stored program instructions or other software elements, logic devices, or other computing elements.

At block 302, client device 130 causes display of a first content at client device 130 according to original display instructions that indicate, at least in part, that a first portion of the first content is to display at an original location. The first content may be content displayed within a graphical user interface. The original display instructions may indicate the location of the first portion of the first content relative to other components. For example, the instructions may indicate that the first portion of the first content is to be displayed above, or after, the second portion of the first content.

At block 304, client device 130 automatically determines that viewing of the particular content is terminated after a second portion of the first content is viewed and before a first portion of the first content is viewed. In some embodiments, client device 130 determines which content has been viewed based on the number of content advancement commands received. For example, client device 130 may determine that less than a particular amount of scroll commands have been received, where the content must be scrolled at least the particular amount of times before the second portion of the first content is visible. As another example, client device 130 may determine that less than a particular amount of commands to request further content from content server 120 have been received, where content must be requested from content server 120 at least the particular of times before the second portion of the first content is retrieved.

At block 306, based on the determination, client device 130 determines modified display instructions that indicate, at least in part, that content corresponding to the first portion of the first content is to be displayed in a particular location that is different from the original location. Client device 130 may automatically determine the modified display instructions by processing instructions of adjustment instructions 142 that correspond to the determination that viewing of the particular content is terminated after a second portion of the first content is viewed and before a first portion of the first content is viewed. Client device 130 may modify display instructions 144 to indicate that that content corresponding to the first portion of the first content is to be displayed in the particular location.

At block 308, client device 130 causes, based on the modified display instructions, display of particular content corresponding to the first portion of the first content at the particular location. Prior to modification, display instructions 144 may have indicated that content corresponding to the first portion of the first content is to display in a different location than the particular location.

In some embodiments, the particular content corresponding to the first portion of the first content is the first portion of the first content itself. For example, in response to determining that viewing of particular content is terminated after some content is viewed and before a particular advertisement is viewed, client device 130 may determine modified display instructions that cause the advertisement to be displayed in a different location.

In other embodiment, the particular content corresponding to the first portion of the first content is different from, but the same type as, the first portion of the first content. For example, in response to determining that viewing of particular content is terminated after some content is viewed and before a particular advertisement is viewed, client device 130 may determine modified display instructions that cause displaying a second, different advertisement in a different location.

In some embodiments, client device 130 only determines the modified display instructions after determining that a pattern has occurred, where the pattern is a pattern of the viewing being terminated after content corresponding to the second portion of the first content is viewed but before content corresponding to the first portion of the first content is viewed. The content corresponding to the first portion of the first content may be one type of content and the content corresponding to the second portion of the first content may be a different type of content.

In some embodiments, the first portion and/or the second portion of the first content are selectable interface components. A selectable interface component is a component that may be selected to cause occurrence of various events, such as scrolling or pagination. The first portion of the first content may be a selectable component for controlling a particular function, such as the font size of the displayed content, and the content corresponding to the first portion of the first content may be a selectable component for controlling the same function.

In an embodiment, the first content comprises advertisements and a set of hyperlinks. The first portion of the first content is the advertisements and the second portion of the first content is the set of hyperlinks. The advertisements may appear below the set of hyperlinks. The client device 130 may determine that a pattern has occurred consisting of terminating application instructions 136 before a particular number of scroll commands are received, where the particular number of scroll commands are the number of scroll commands that are required before the second portion of the first content is displayed. In response to this determination, and based on adjustment instructions 142, client device 130 may modify a portion of display instructions 144 that controls where the advertisements and/or set of hyperlinks are displayed. The modification may cause content corresponding to the first portion of the first content, which may be other advertisements, to be displayed before the content corresponding to the second portion of the first content, which may be sets of hyperlinks.

In some embodiments, changing the display location for the content corresponding to the first portion of the first content comprises changing the ordering of various portions of the first content so that the first portion of the first content is displayed earlier. In other embodiments, changing the location of display for the content corresponding to the first portion of the first content comprises modifying the display settings so a greater amount of content is visible in a single frame of display without scrolling. Modifying the display settings may include changing the layout to a column format, where a different format was used prior to the modification. Modifying the display settings may also include, in some embodiments, decreasing font or image size. By using the approaches described herein, content providers and other providers of application instructions 136 may ensure that priority content is viewed by changing the display location of the priority content to a location that is more likely to be viewed.

2.3 Intelligent Removal or Resizing of Interface Components

Figure 4:
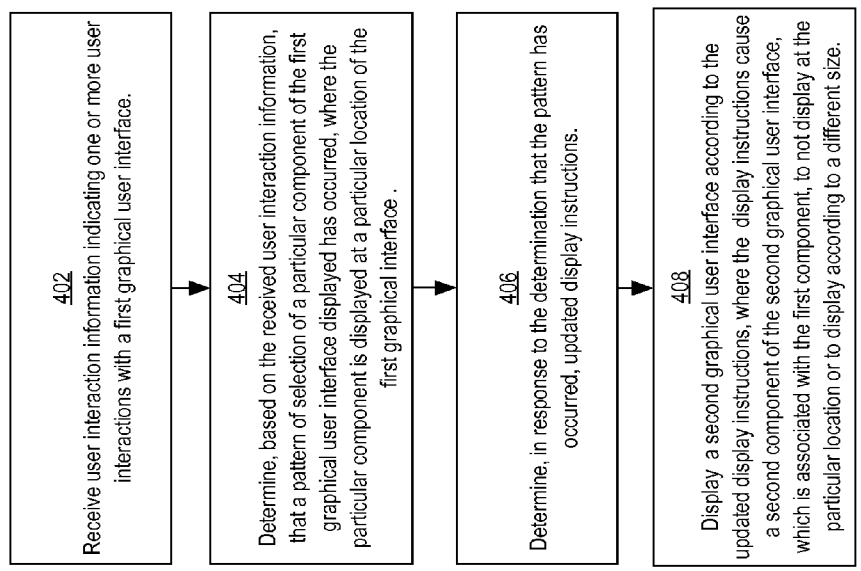
FIG. 4 illustrates an example method for the intelligent removal of graphical user interface components.

FIG. 4 illustrates an example method for the intelligent removal of interface components. The example method may be implemented at client device 130 of FIG. 1 using stored program instructions or other software elements, logic devices, or other computing elements. At block 402, client device 130 receives user interaction information indicating one or more user interactions with a graphical user interface. The user interaction may be a user selection of one or more components of the graphical user interface.

At block 404, client device 130 determines, based on the received user interaction information, that a pattern of selection of a particular component of a first graphical user interface has occurred, where the particular component is displayed at a particular location of the first graphical user interface.

In some embodiments, a particular pattern of selection may be determined to occur when a particular component is selected less than a threshold number of times within a fixed period. The definition of the period may vary according to different embodiments. For example, a particular pattern of selection may be determine to occur if a particular component is selected less than a threshold amount of times after being displayed for 120 seconds. In another embodiment, a particular pattern of selection may be determine to occur if a particular component is selected less than a particular amount of times during two different application sessions.

In some embodiments, the pattern occurs if the particular component is not selected 80 percent of the times that the graphical user interface is displayed. In other embodiments, the pattern occurs if the particular component is not selected any of the times the graphical user interface is displayed. Adjustment conditions 140 may define the conditions of the pattern of selection.

At block 406, client device 130 determines, in response to the determination that the pattern has occurred, updated display instructions. The updated display instructions may be determined by updating portions of display instructions 144. At block 408, client device 130 displays a second graphical user interface according to the updated display instructions, where the display instructions cause a second component of the second graphical interface, which is associated with the first component, to not display at the particular location or to display according to a different size.

In other embodiments, the updated display instructions, which are updated in response to determining that a pattern of selection has occurred, may cause a smaller version of the second component associated with the first component to display instead of an original sized version of the second component. Such a pattern of selection may require that a particular component be selected less than a threshold number of times. Client device 130 may implement the change by modifying display instructions. For example, client device 130 may cause the smaller version of the second component to appear by replacing a first portion of instructions, which indicate that the second component is to be of a first size when displayed, with a different set of instructions, which indicate that the second component is to be of a different, smaller size when displayed. Such an approach may reduce the amount of screen space occupied by infrequently selected components.

In another embodiment, the pattern of selection may require that a particular component be selected more than a threshold number of times within a fixed period. In response to determining that the component has been selected more than the particular threshold of times, client device 130 may cause a larger version of the particular component to display instead of the original sized version. Thus, the sizes of selectable graphical user interface components may increase or decrease depending on the frequency by which users choose to select such components.

In some embodiments, the second component of the graphical user interface is the same as the first component of the graphical user interface. For example, in response to determining a pattern of non-selection of a "Refresh" option, updated display instructions may be determined which cause the "Refresh" option to disappear from the particular location.

In response to the determination, client device 130 may update the graphical user interface dynamically to cause removal of the second component from the particular location and/or to cause resizing of the second component. The application controlling the display of the graphical user interface may not need to restart and every other aspect of the graphical user interface may remain unchanged by the update.

According to an embodiment, the particular component is an advertisement. For example, in response to a determination that a particular type of advertisement is not commonly selected, the particular type of advertisement may be removed from the graphical interface or may be resized to be smaller. According to other embodiments, the particular component may be a selectable interface component, which a user may select to indicate a particular user command.

Figure 5:
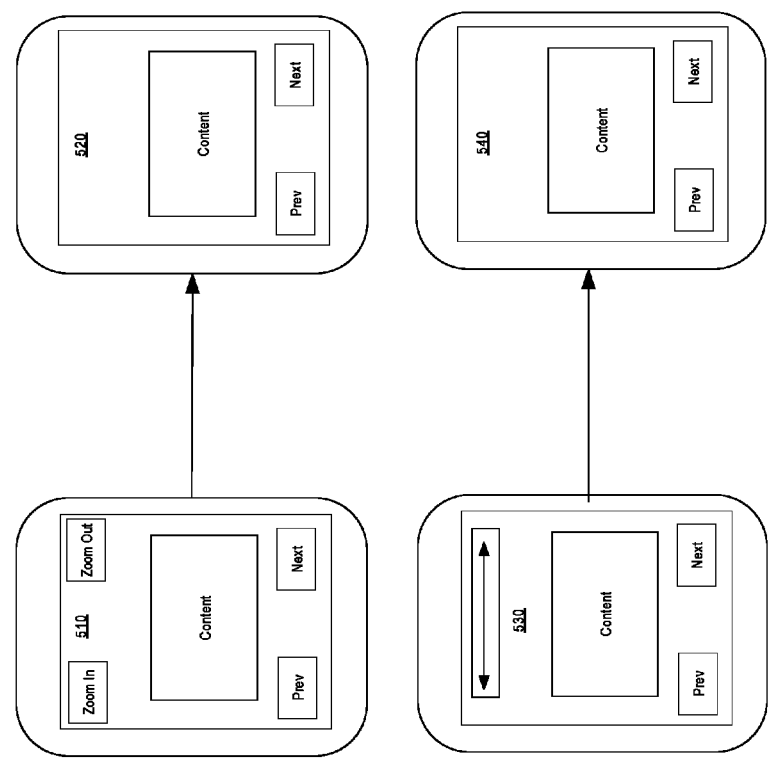
FIG. 5 illustrates results of example intelligent adjustments to graphical user interfaces.

FIG. 5 illustrates results of example intelligent adjustments to graphical user interfaces. The adjustment may be a result of the methods described herein. Interfaces 510, 530 are graphical user interfaces of a client device, before the intelligent removal of interface component(s). Interfaces 520, 540 are graphical user interfaces of a client device after the intelligent removal of an interface component(s). Each of interfaces 510, 520, 530, 540 may be displayed at client device 130.

Interface 510 includes selectable interface components for zooming in and out of a particular region of the content. Client device 130 may determine, based on received user interaction information about interactions with the interfaces, the occurrence of a pattern of non-selection of the scroll bar. In response to determining the occurrence of the pattern of non-selection of either the "Zoom In" or "Zoom Out" button, client device 130 may dynamically adjust interface 510, which may result in interface 520, where there are no selectable components for zooming in or out.

In some embodiments, the first component of the graphical user interface, for which a pattern of non-selection is determined, is for controlling a particular functionality and the second component, which is caused to not appear, is different than the first component but is for controlling the same particular functionality. For example, client device 130 may determine an occurrence of a pattern of non-selection of the "Zoom In" button. In response to the determined pattern, client device 130 may determine updated display instructions that cause both the "Zoom In" and "Zoom Out" buttons to not display anywhere in the interface.

In other embodiments, the second component, which is caused to disappear, may be a navigation bar that includes selectable components for navigating to different locations in the content. Client device 130 may cause the navigation bar to disappear in response to determining that some or all of the components of the navigation bar are infrequently selected.

Client device 130 may allow a user to cause the second component to re-appear, at least temporarily, by performing a particular command. For example, a user using adjusted interface 520 may cause the "Zoom In" and "Zoom Out" button to reappear by tapping twice at the top of a screen. The buttons may re-appear for a fixed amount of time, such as 5 seconds, before being removed again.

Interface 520 includes a scroll bar for causing the content to scroll. Interface 520 also includes selectable soft-keys, which a user may select to view the previous or next page. A viewer may view a next or previous page by interacting with the scroll bar or the selectable soft-keys. Client device 130 may determine, based on received user interaction information about interactions with the interfaces, the occurrence of a pattern of non-selection of the scroll bar. In response to determining the occurrence of the pattern of non-selection of the scroll bar, client device 130 may cause an adjustment to interface 520, which results in interface 540, which is without a scroll bar.

In some embodiments, the displayed graphical user interface may include multiple components for causing the same function, such as a scroll bar and soft-key that may both be used to advance to the next page. In such an embodiment, in response to determining that one component is selected more often than the other component for causing the same function, client device 130 may dynamically remove the less used components from the interface. The particular conditions that trigger client device 130 to adjust the graphical user interface by removing the particular component may be defined in adjustment conditions 140. Adjustment instructions 142 may include the instructions for causing the adjustment, which may cause client device 130 to modify display instructions 144. Using the approaches described herein, the intelligent graphical user interface may automatically adjust to remove components that are not commonly used, resulting in a less cluttered interface.

2.4 Intelligent Relocation of Graphical User Interface Components

Figure 6:
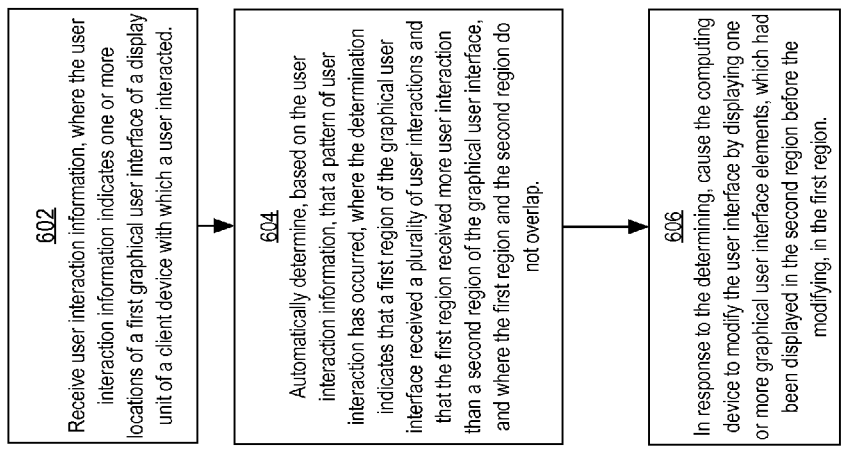
FIG. 6 illustrates an example method for the intelligent re-location of graphical user interface components.

FIG. 6 illustrates an example method for the intelligent relocation of graphical user interface components. The example method may be implemented at client device 130 of FIG. 1 using stored program instructions or other software elements, logic devices, or other computing elements. At block 602, client device 130 receives user interaction information, where the user interaction information indicates one or more locations of a first graphical user interface of a display unit of the client device with which a user interacted.

The user may have interacted with selectable components of the graphical user interface or other locations of the graphical user interface that do not represent selectable interface component. For example, user interaction information may indicate that a user interacted with various locations within the background of the graphical user interface, where the graphical user interface does not visibly indicate that the various locations are selectable.

At block 604, client device 130 automatically determines, based on the user interaction information, that a pattern of user interaction has occurred, where the determination indicates that a first region of the graphical user interface received a plurality of user interactions and that the first region received more user interaction than a second region of the graphical user interface, and where the first region and the second region do not overlap, At block 606, in response to the determining, client device 130 causes itself to modify the graphical user interface by displaying one or more graphical user interface elements, which had been displayed in the second region before the modifying, in the first region. Thus, the graphical user interface elements are relocated to a different region in response to detecting the pattern of user interaction. Client device 130 may cause the modification to the graphical user interface by modifying display instructions 144.

In an embodiment, all of the interface elements that are displayed in the first region of the graphical user interface are moved to the second region. In other embodiments, only some of the interface elements that are displayed in the first region of the graphical user interface are moved to the second region. For example, certain components may be deemed to be of greater importance than other components and, in some embodiments, client device 130 may only cause the important components located in the first region to move to the second region.

Adjustment conditions 140 may define the conditions that would trigger the re-location of interface components. For example, adjustment condition 140 may indicate that components are to be re-located from a first region to a second region, if the second region receives four times as many user interactions as the first region and at least eight interactions are received total. Adjustment instructions 142 may include instructions for causing the re-location, which client device 130 may process in response to determining that a condition requiring adjustment has occurred.

Figure 7:
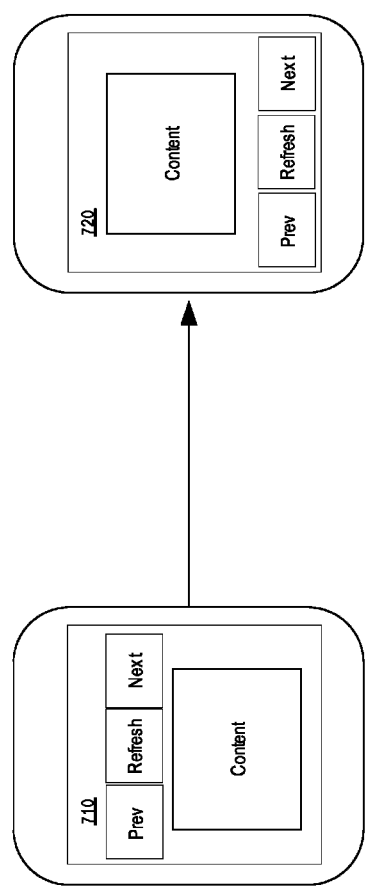
FIG. 7 illustrates results of example intelligent adjustments to graphical user interfaces.

FIG. 7 illustrates results of example intelligent adjustments to graphical user interfaces. The adjustment may be a result of the methods described herein. Interface 710 is a graphical user interface of a client device, such as client device 130, before an intelligent adjustment. Interface 720 is a graphical user interface of the client device after intelligent adjustment.

Interface 710 comprises selectable components, such as soft-keys that are displayed above the featured content. A soft-key is a graphical interface component that causes particular software functionality when selected. The selectable components include a component that corresponds to a command for displaying a previous page of the content, a component that corresponds to a command for displaying a next page of the content, and a component that corresponds to a command for refreshing the content. Client device 130 may determine, based on received user interaction, that the top half of the interface 710 receives more user interaction than the bottom half of interface 710. For example, a user may perform a gesture that zoom command by touching the bottom half of the background of interface 710 more often than the top half of the background of interface 710. In response to the determining, client device 130 may cause the components to display below the featured content, as depicted in interface 720.

In an embodiment, the modified graphical user interface is the same as the un-modified graphical user interface except for the relocation of the one or more interface components For example, interface 710 and 720 are the same except for the relocation of the particular soft keys displayed in the top half of interface 710 to the bottom half of the interface, as depicted in interface 720.

In some embodiments, the relocated components of the graphical user interface are advertisements or components for causing operations unrelated to layout or display modification. For example, the components may be components that an application provider is particularly interested in promoting, such as a component that may be selected to "rate" the application in an application rating system.

The approaches for the intelligent relocation of interface components, as described herein, may be particularly useful in a situation where a particular region of the client device is more easily accessible to a user than other regions of the client device, such as when the user operates the client device with only one hand. In such a situation, client device 130 may, based on information received about a user's interactions with the device, determine that the user prefers to interact with a particular portion of the client device display screen, such as the right half. As a result, client device 130 may automatically adjust the graphical user interface to cause more components to be displayed on the right half of the graphical user interface.

2.5 Intelligent Automation of a Display Event

In some embodiments, client device 130 automates the occurrence of a display event in response to determining that a pattern of receiving a user command for a particular display event has occurred.

Figure 8:
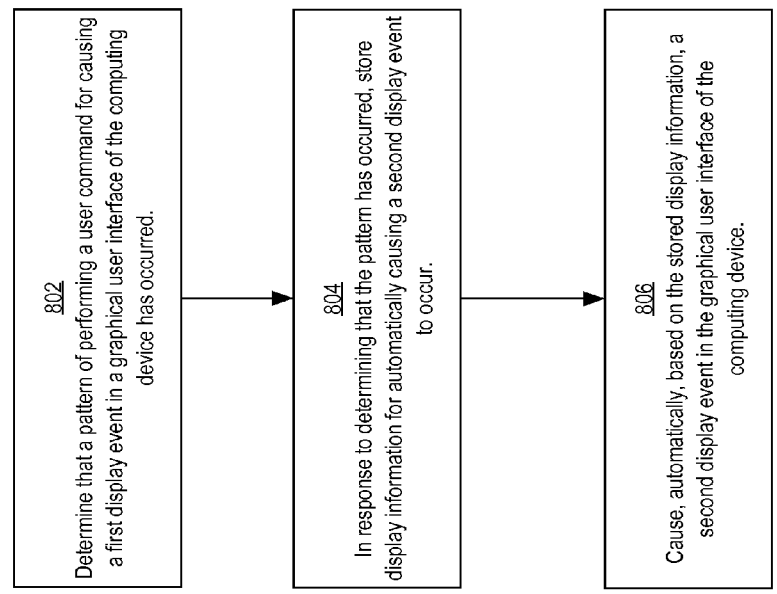
FIG. 8 illustrates an example method for the intelligent automation of a display event.

FIG. 8 illustrates an example method for the intelligent automation of a display event. The example method may be implemented at client device 130 of FIG. 1 using stored program instructions or other software elements, logic devices, or other computing elements. At block 802, client device 130 determines that a pattern of receiving a user command for causing a display event in a graphical user interface of the computing device has occurred. The display event may be any event that changes how the content within the graphical user interfaced is displayed including, but not limited to, scrolling, zooming in or out on particular regions of the graphical user interface, changing the layout, or changing font size.

At block 804, in response to determining that the pattern has occurred, client device 130 stores display information for automatically causing a second display event to occur. Storing display information may comprise modifying at least a portion of display instructions 144, which control when the second display event occurs. By storing the display instructions, client device 130 may automate the occurrence of the second display event. At block 806, based on the stored display information, client device 130 automatically causes a second display event in the graphical user interface of the computing device.

Adjustment conditions 140 may define the conditions of the display event pattern. The occurrence of the condition may trigger client device 130 to automate the occurrence of a display event to occur by storing the above display information. For example, adjustment conditions 140 may indicate that a particular display event patter has occurred if (1) a command for a particular display event is received more than 50 percent of the time that new content is displayed within the graphical user interface and (2) new content has been displayed within the graphical user interface at least three times. In response to determining that new content has been displayed at least three times and that the particular display event has occurred at least 50 percent of the time the new content has been displayed, client device 130 may cause automation of the particular display event that corresponds to the display event pattern.

In some embodiments, a display event pattern comprises a sequence of user commands for a plurality of display events. For example, adjustment conditions 140 may indicate that a particular pattern occurs if a command to zoom in on a particular region is followed by a command to zoom out on a particular region and the sequence of commands is received more than 60 percent of the time images are displayed.

In some embodiments, the second display event is the same as the first display event. For example, in response to determining that a pattern of receiving user commands for zooming in on a particular region has occurred, client device 130 may cause an enlarged version of the particular region to automatically display. In other embodiments, the second display event is different from the first display event. For example, in response to determining that a pattern of receiving user commands for zooming in on a particular region has occurred, client device 130 may store display information for automatically changing the image size of additional images or all images, or font style or size for additional text or all text.

In some embodiments, some patterns require that a particular command be received after a particular triggering event. In such embodiments, the display information may automatically cause the one or more second display events to occur in response to the particular triggering event. For example, client device 130 may determine that a pattern of receiving a command to zoom shortly after content containing images is displayed has occurred. In response to determining the occurrence of the pattern, client device 130 may store display information for automatically causing the zooming to occur after the content is displayed if content containing images are displayed.

In some cases, the approaches described herein may automatically cause the occurrence of certain display events, which improve the interface for the user, based on observed patterns of user commands. Such a dynamic adjusting interface may relieve the user from having to repeatedly perform the same command(s).

2.6 Intelligent Interface Adjustment Based on Browser Information

In some embodiments, client device 130 causes an intelligent adjustment to a graphical user interface based, at least in part, on information received from browser 146. The information received from browser 146 may indicate, in part, browser window information, such as a height or width of the browser window, or device system information, such as pixel density of the screen of client device 130, screen brightness or the type or quality of client device 130's network connection.

Intelligent adjustment logic 138 may collect such information from browser display model 148. Browser display model 148 may maintain information about the browser window and device system. Browser display model 148 is, in some embodiments, a Document Object Model (DOM).

Application instructions 136 may cause one or more graphical user interface adjustment to occur based at least in part on the information collected from browser display model 148. For example, intelligent adjustment logic 138 may automatically cause the color or brightness of at least a portion of the graphical user interface to change based on the collected browser information. For example, intelligent adjustment logic 138 may cause the color of one or more interface components to be brighter or may cause the entire interface to be brighter in response to determining that the size of the displayed browser screen is less than particular size amount, that an amount of pixel density at the client device is less than a particular pixel density amount, or that the screen brightness level is less than a particular brightness level.

In another embodiment, intelligent adjustment logic 138 may cause graphical interface changes in response to a determination about the change in network connection quality. For example, in response to determining that the quality of a network connection has degraded to be below a threshold level, intelligent adjustment logic 138 may cause the graphical user interface to automatically load less content. As another example, in response to the determination, intelligent adjustment logic 138 may cause fewer graphical user interface components to automatically load. Instead of two different advertisements, intelligent adjustment logic 128 may cause only a single advertisement to load.

In another embodiment, intelligent adjustment logic 138 may cause graphical interface changes in response to a determination about the change in display brightness. For example, in response to determining that the screen has dimmed, intelligent adjustment logic 138 may darken the font color, adjust font color and/or background color so there is a greater contrast between font and background color, or change the background pattern from a design pattern to a solid color pattern.

Application instructions 136 may cause the change to occur by modifying display instructions 144, which control the display of the application's graphical interface. The change may only affect the corresponding application's graphical interface and may not modify interfaces of other applications or other interfaces of the general system.

In some embodiments, adjustment conditions 140 cause one or more graphical user interface adjustment based on both information collected from browser display model and based on user interaction information. For example, application instructions 136 may cause the removal of one or more interface components based on a determination that a pattern of the particular component being infrequently selected has occurred and a determination that the area of the screen size is less than a predetermined amount. As another example, application instructions 136 may cause the size of a particular interface component to increase based on a determination that the particular interface component is infrequently selected and the screen brightness level is below a particular threshold. In some embodiments, application instructions 136 may automatically cause the color or brightness of the graphical user interface to change based on a determination that a pattern of zooming has occurred and that the screen brightness level is below a particular threshold.

3.0 Implementation Mechanisms—Hardware Overview

Figure 9:
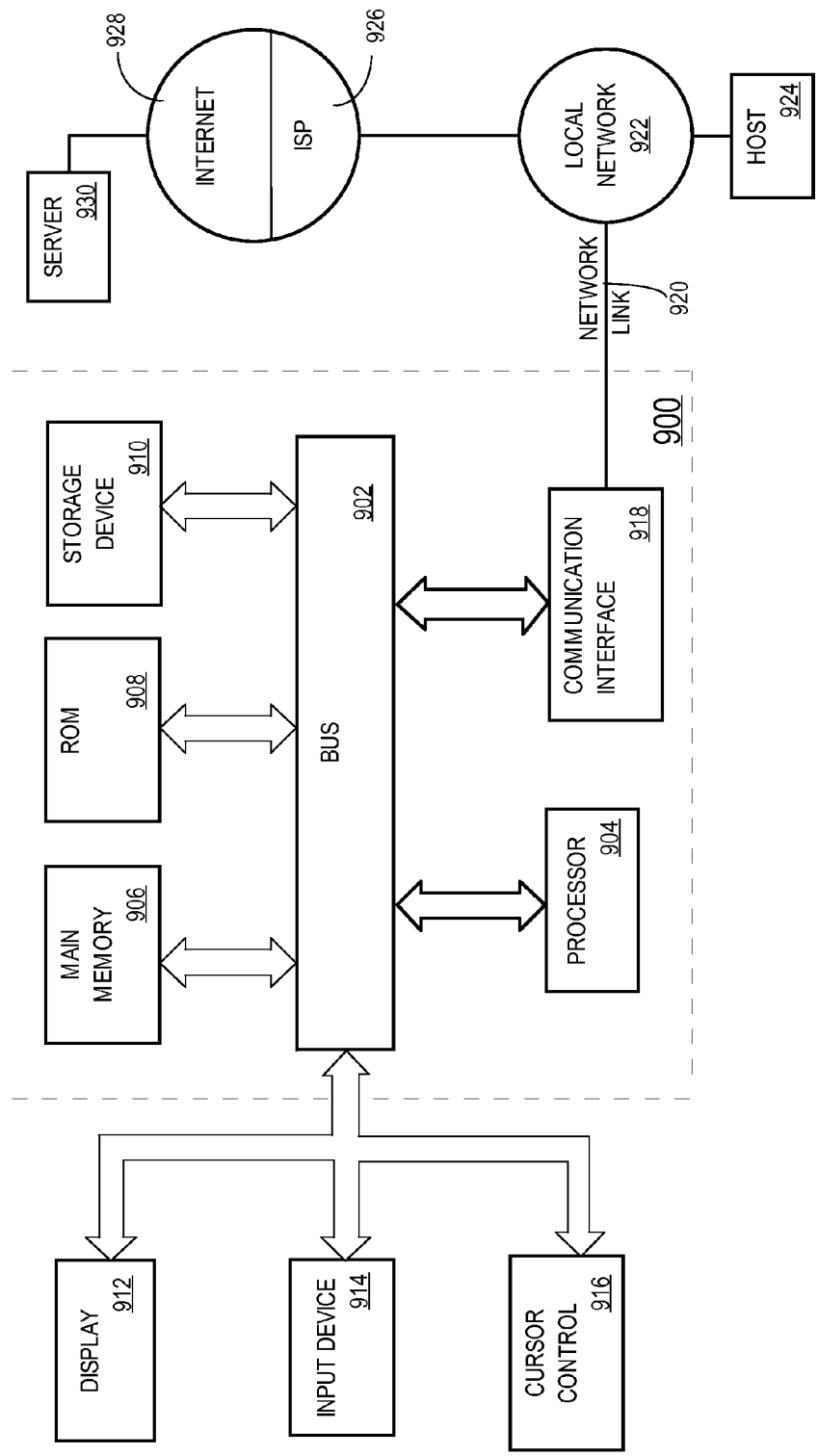
FIG. 9 illustrates a computer system upon which embodiments may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media and transmission media. Storage media includes both non-volatile media and volatile media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at a computing device, a plurality of user interaction information, wherein each user interaction information in the plurality of user interaction information indicates one or more locations of a graphical user interface of a display unit of the computing device with which a user interacted;
    wherein the graphical user interface comprises a plurality of regions, and each location with which a user interacted is within a particular region of the plurality of regions;
    determining, by the computing device, automatically based on the plurality of user interaction information, that a pattern of user interaction has occurred, wherein the pattern of user interaction indicated by the plurality of user interaction information indicates that a first region of the plurality of regions received more user interaction than a second region of the plurality of regions, wherein the first region and the second region do not overlap;
    in response to determining that the pattern of user interaction has occurred, automatically at the computing device, without receiving a user command, modifying the graphical user interface by displaying, in the first region, one or more graphical user interface elements that had been displayed in the second region before the modifying;
    wherein the one or more graphical user interface elements are not displayed in the second region after the modifying;
    wherein the displaying one or more graphical user interface elements occurs without receiving a user command to cause the displaying of the one or more graphical user elements;
    wherein the method is performed by one or more computing devices.

2. The method of claim 1, wherein the graphical user interface is displayed at a client computing device and wherein the modifying is based, in part, on instructions stored at the client device that indicate that the modifying is to automatically occur in response to the determining.

3. The method of claim 1, wherein each user interaction information indicates a user interaction with a particular location of the graphical user interface, wherein the particular location is not a selectable interface component.

4. The method of claim 1, further comprising:
    receiving, at a particular application of a client device, from a browser of the client device, browser information indicating a size of a browse window or device state information;
    wherein the computing device is caused to modify the graphical user interface based in part on the browser information.

5. The method of claim 1, wherein a plurality of graphical user interface elements had been displayed in the second region and modifying the graphical user interface further comprises:
    displaying, in the first region, the plurality of graphical user interface elements that had been displayed in the second region before the modifying.

6. The method of claim 1, wherein a plurality of graphical user interface elements had been displayed in the second region and modifying the graphical user interface further comprises:
    displaying, in the first region, one or more graphical user interface elements in the plurality of graphical user interface elements; and
    displaying, in the second region, graphical user interface elements in the plurality of graphical user interface elements that are not the one or more graphical user interface elements.

7. The method of claim 6, further comprising determining that the one or more graphical user interface elements are higher importance elements.

8. The method of claim 1, wherein the graphical user interface is displayed at a client computing device and wherein the modifying is based, in part, on instructions stored at the client device that indicate one or more conditions for determining that the pattern of user interaction has occurred.

9. The method of claim 1, wherein the graphical user interface is displayed at a client computing device and wherein the modifying is based, in part, on instructions received from a server computer.

10. The method of claim 1, wherein a user interaction comprises at least one of: touching, selecting, gesturing, zooming, or scrolling the display unit of the computing device.

\* \* \* \* \*